United States Patent
Fatemi et al.

(10) Patent No.: US 12,206,288 B2
(45) Date of Patent: Jan. 21, 2025

(54) ROTOR FOR AN ELECTRIC MACHINE

(71) Applicant: GM Global Technology Operations LLC, Detroit, MI (US)

(72) Inventors: Alireza Fatemi, Canton, MI (US); Huaxin Li, Rochester Hills, MI (US); Yucong Wang, West Bloomfield, MI (US); Eric C. Clough, Santa Monica, CA (US); Jonathan Watson, San Diego, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 235 days.

(21) Appl. No.: 17/883,887

(22) Filed: Aug. 9, 2022

(65) Prior Publication Data
US 2024/0055919 A1  Feb. 15, 2024

(51) Int. Cl.
| | |
|---|---|
| *H02K 1/27* | (2022.01) |
| *H02K 1/276* | (2022.01) |
| *H02K 15/02* | (2006.01) |
| *H02K 15/03* | (2006.01) |
| *H02K 21/12* | (2006.01) |

(52) U.S. Cl.
CPC ......... *H02K 1/2766* (2013.01); *H02K 15/024* (2013.01); *H02K 15/03* (2013.01)

(58) Field of Classification Search
CPC .... H02K 1/2766; H02K 15/024; H02K 21/14; H02K 21/22; H02K 1/27; H02K 15/03
USPC .................................................... 310/156.53
See application file for complete search history.

(56) References Cited

U.S. PATENT DOCUMENTS

| | | | | |
|---|---|---|---|---|
| 5,864,192 A  * | 1/1999 | Nagate | ............... | H02K 29/08 310/216.106 |
| 6,255,005 B1 * | 7/2001 | Yokoyama | ............... | C22C 38/40 148/309 |
| 6,525,442 B2 * | 2/2003 | Koharagi | ............... | H02K 1/2766 310/156.56 |
| 6,891,297 B2 * | 5/2005 | Shimada | ............... | H02K 15/03 310/156.01 |
| 7,397,154 B2 * | 7/2008 | Tilton | ............... | H02K 5/18 310/64 |
| 7,605,510 B2 * | 10/2009 | Okuma | ............... | H02K 1/2766 310/156.56 |
| 8,179,011 B2 * | 5/2012 | Takemoto | ............... | H02K 29/03 310/156.53 |
| 9,154,005 B2 * | 10/2015 | Kitagawa | ............... | H02K 1/2766 |
| 10,879,775 B2 * | 12/2020 | Zhu | ............... | B32B 38/04 |
| 11,205,941 B2 * | 12/2021 | Zhu | ............... | H02K 15/02 |
| 2022/0368184 A1 * | 11/2022 | He | ............... | H02K 1/28 |

(Continued)

FOREIGN PATENT DOCUMENTS

| | | | | |
|---|---|---|---|---|
| JP | 11018324 A | * | 1/1999 | ............... H02K 1/06 |
| JP | 2015-201997 | * | 11/2015 | ............... H02K 1/27 |

*Primary Examiner* — Burton S Mullins
(74) *Attorney, Agent, or Firm* — CANTOR COLBURN LLP

(57) ABSTRACT

An electric machine may have a stator and a rotor including stacked plurality of electrical steel laminations forming a slot including a first end and opposing sides, the first end defined by a bridge extending between electrical steel on opposing sides of the slot, the bridge being located between the first end of the slot and an outer diameter surface of the rotor and beneath the outer diameter surface of the rotor, the bridge forming a base of a channel open at an outer diameter surface of the rotor.

20 Claims, 5 Drawing Sheets

(56) References Cited

U.S. PATENT DOCUMENTS

| | | | |
|---|---|---|---|
| 2023/0145591 A1* | 5/2023 | Hisada | H02K 1/2766 310/156.53 |
| 2023/0246526 A1* | 8/2023 | Hamada | H02K 1/02 |

* cited by examiner

ROTOR FOR AN ELECTRIC MACHINE

INTRODUCTION

The subject disclosure relates to rotary electric machines.

Interior permanent magnet machines and induction machines include rotors which may contain magnets or conductive bars. Pure synchronous reluctance machines do not contain magnets. The bulk of a rotor may be made from stacked electrical steel laminations. Cavities in the bulk structure may contain and retain magnets or conductive bars and provide flux barriers. Bridges and webs of magnetic material may delimit such cavities and provide structural joining of bulk material across such cavities. However, bridges and webs result in undesirable flux leakage paths.

SUMMARY

In one exemplary embodiment, an electric machine may include a stator and a rotor having stacked plurality of electrical steel laminations forming a slot including a first end and opposing sides, the first end defined by a bridge extending between electrical steel on opposing sides of the slot, the bridge being located between the first end of the slot and an outer diameter surface of the rotor and beneath the outer diameter surface of the rotor, the bridge forming a base of a channel open at an outer diameter surface of the rotor.

In addition to one or more of the features described herein, the bridge may include electrical steel.

In addition to one or more of the features described herein, the bridge may include an electrical steel bridge section integral with the laminations and a supplemental bridge support including a structural flux barrier.

In addition to one or more of the features described herein, the supplemental bridge support may include a paramagnetic metal.

In addition to one or more of the features described herein, the supplemental bridge support including the paramagnetic metal may be welded to the electrical steel laminations.

In addition to one or more of the features described herein, the supplemental bridge support including the paramagnetic metal may be deposited in situ upon the electrical steel bridge section.

In addition to one or more of the features described herein, the bridge may include an electrical steel bridge section integral with the laminations, the electrical steel bridge section being surface alloyed on a surface opposite the first end of the slot.

In addition to one or more of the features described herein, the bridge may further include a supplemental bridge support including a structural flux barrier.

In addition to one or more of the features described herein, the supplemental bridge support may include a paramagnetic metal.

In addition to one or more of the features described herein, the supplemental bridge support including the paramagnetic metal may be welded to the laminations.

In addition to one or more of the features described herein, the supplemental bridge support including the paramagnetic metal may be deposited in situ upon the electrical steel bridge section.

In addition to one or more of the features described herein, the channel open at the outer diameter surface of the rotor may include non-parallel sidewalls increasingly opening toward the outer diameter surface of the rotor.

In addition to one or more of the features described herein, the channel may filled with a dielectric polymer.

In addition to one or more of the features described herein, the electric machine may further include one of a permanent magnet within the slot or a conductive bar within the slot.

In addition to one or more of the features described herein, the bridge may be austenitized through a localized heat treatment.

In another exemplary embodiment, an electrified powertrain may include a battery pack, a traction power inverter module ("TPIM") connected to the battery pack, and configured to change a direct current ("DC") voltage from the battery pack to an alternating current ("AC") voltage, and a rotary electric machine energized by the AC voltage from the TPIM, the electric machine including a stator, a rotor surrounded by the stator, the rotor including a stacked plurality of electrical steel laminations forming a slot including a first end and opposing sides, the first end defined by a bridge extending between electrical steel on opposing sides of the slot, the bridge being located between the first end of the slot and an outer diameter surface of the rotor and beneath the outer diameter surface of the rotor, the bridge forming a base of a channel open at an outer diameter surface of the rotor, a rotor shaft connected to and surrounded by the rotor, and configured to rotate about an axis of rotation in conjunction with the rotor when the electric machine is energized, and a transmission coupled to the rotor shaft and powered by the electric machine.

In addition to one or more of the features described herein, the bridge may include an electrical steel bridge section integral with the laminations and a supplemental bridge support comprising a structural flux barrier of a paramagnetic metal.

In addition to one or more of the features described herein, the structural flux barrier may be welded to the laminations.

In yet another exemplary embodiment, a method of constructing a rotor may include stacking a plurality of electrical steel laminations forming a slot including a first end and opposing sides, the first end defined by a bridge extending between electrical steel on opposing sides of the slot, the bridge being located between the first end of the slot and an outer diameter surface of the rotor and beneath the outer diameter surface of the rotor, the bridge forming a base of a channel open at an outer diameter surface of the rotor, welding a supplemental bridge support to the laminations at the base of the channel, and filling the channel with a non-magnetic and electrically non-conductive material.

In addition to one or more of the features described herein, the method may further include at least partially filling the slot with one of a permanent magnet and a conductive bar.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
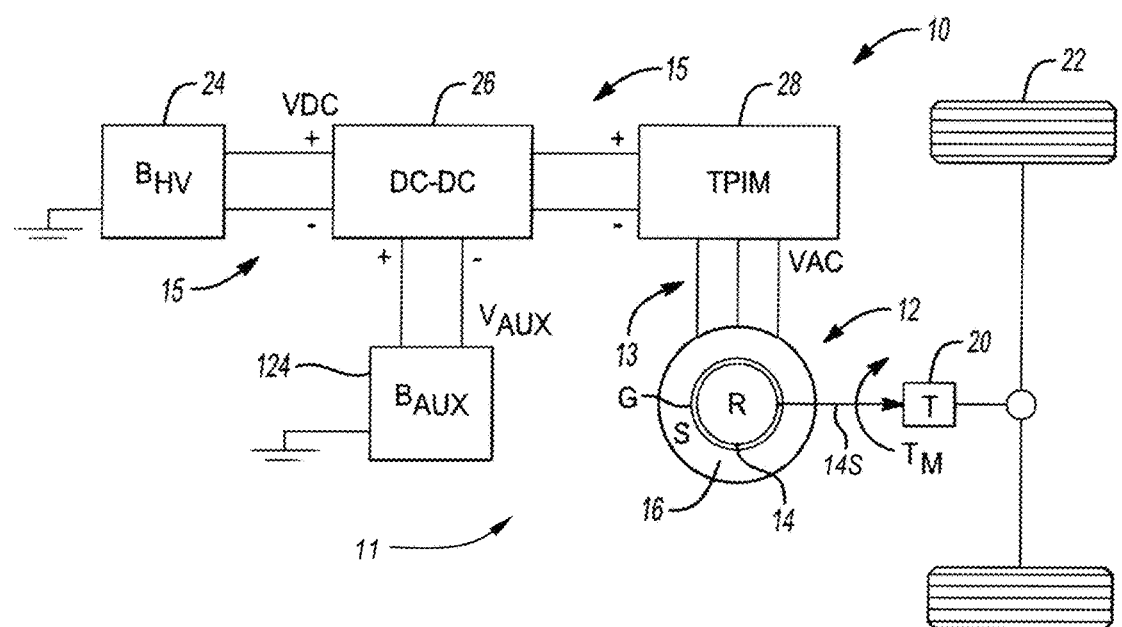
FIG. 1 illustrates an electrified powertrain, in accordance with one or more embodiments.

The following description is merely exemplary in nature and is not intended to limit the present disclosure, its application or uses. Throughout the drawings, corresponding reference numerals indicate like or corresponding parts and features.

Referring to the drawings, wherein like reference numbers refer to the same or like components in the several Figures, an electrified powertrain 10 is depicted schematically in FIG. 1, (e.g., for use aboard an exemplary motor vehicle 11.) The powertrain 10 includes a rotary electric machine 12 having a rotor 14 and a stator 16. When the stator 16 is energized, the rotor 14 supplies motor torque (arrow $T_M$) to a transmission ("T") 20, (e.g., a stepped-gear automatic transmission.) Although omitted for illustrative simplicity, the electrified powertrain 10 may also include an internal combustion engine configured to generate engine torque. When so equipped, the generated engine torque may be selectively provided to the transmission 20, either alone or in conjunction with the motor torque (arrow $T_M$) from the electric machine 12.

When the vehicle 11 of FIG. 1 is embodied as a hybrid electric vehicle, the electric machine 12 and/or the engine may power the transmission 20. Alternatively, the vehicle 11 may be a battery electric vehicle, in which case the transmission 20 may be powered solely by the motor torque (arrow $T_M$) from the electric machine 12. The disclosed improvements relate to the construction of the electric machine 12, and may be realized in hybrid electric vehicle ("HEV") and electric vehicle ("EV") embodiments of the vehicle 11 without limitation, as well as in non-vehicular applications such as power plants, hoists, mobile platforms and robots, etc.

With continued reference to the exemplary vehicle 11 of FIG. 1, the electrified powertrain 10 may include an alternating current ("AC") voltage bus 13. The AC voltage bus 13 may be selectively energized via a traction power inverter module ("TPIM") 28 that is direct current ("DC") coupled to a high-voltage battery pack ("$B_{HV}$") 24, for instance a lithium ion, lithium sulfur, nickel metal hydride, or other high-energy voltage supply. The AC voltage bus 13 provides an AC bus voltage ("VAC") and conducts AC current to or from the electric machine 12. The motor torque (arrow $T_M$) from the energized electric machine 12, when operating in a drive or motoring mode, is imparted to a rotor shaft 14S of the rotor 14, with the rotor shaft 14S journaled, splined, or otherwise connected to the rotor 14. The motor torque (arrow $T_M$) is then directed to a coupled load, such as the transmission 20 and/or one or more road wheels 22.

The electrified powertrain 10 may also include a DC to DC ("DC-DC") converter 26 configured to reduce or increase a relatively high DC bus voltage ("VDC") as needed. The DC-DC converter 26 is connected between the battery pack 24 and the TPIM 28 via positive (+) and negative (−) rails of a corresponding DC voltage bus 15. In some configurations, an auxiliary battery pack ("$B_{AUX}$") 124 may be connected to the DC-DC converter 26, with the auxiliary battery pack 124 which may be embodied as a lead-acid battery or a battery constructed of another application-suitable chemistry and configured to store or supply, for example, a 12-15V auxiliary voltage ("$V_{AUX}$") to one or more connected auxiliary devices (not shown).

The rotor 14 of the electric machine 12 is positioned adjacent to the stator 16 and separated therefrom by an airgap G, with such an airgap G forming a magnetic flux barrier. The stator 16 and the rotor 14 may be constructed from a stack-up of thin laminations, (e.g., electrical steel or another ferrous material, with each lamination typically being about 0.2 mm-0.5 mm thick as will be appreciated by those of ordinary skill in the art.) Laminations may be cut to their finished shape by a punch and die or may be cut by a laser, or by wire electrical discharge machining. The rotor according to a non-limiting exemplary embodiment is arranged concentrically within the stator 16 such that the stator 16 surrounds the rotor 14. In such an embodiment, the airgap G is a radial airgap and the electric machine 12 embodies a radial flux-type machine. However, other embodiments may be realized in which the relative positions of the rotor 14 and stator 16 are reversed. For illustrative consistency, the embodiment of FIG. 1 in which the rotor 14 resides radially within the stator 16 will be described herein without limiting the construction to such a configuration. The rotor 14 may, for example, be embodied in an interior permanent magnet (IPM) machine, a permanent magnet synchronous reluctance (PMSR) machine, a synchronous reluctance (SR) machine, or an induction machine.

The rotor 14 shown schematically in FIG. 1 includes internal rotor slots characterized by voids in the electrical steel of the laminations. Such rotor slots may provide a flux barrier internal to the rotor 14 and may contain other rotor features as further described herein. In an IPM machine embodiment or a PMSR machine embodiment, the rotor slots may be partially or completely filled with permanent magnets. In a SR machine embodiment, the rotor slots may be partially or completely filled with substantially non-magnetic material. In an induction machine embodiment, the rotor slots may be completely or partially filled with substantially non-magnetic, electrically conductive material.

Figure 2:
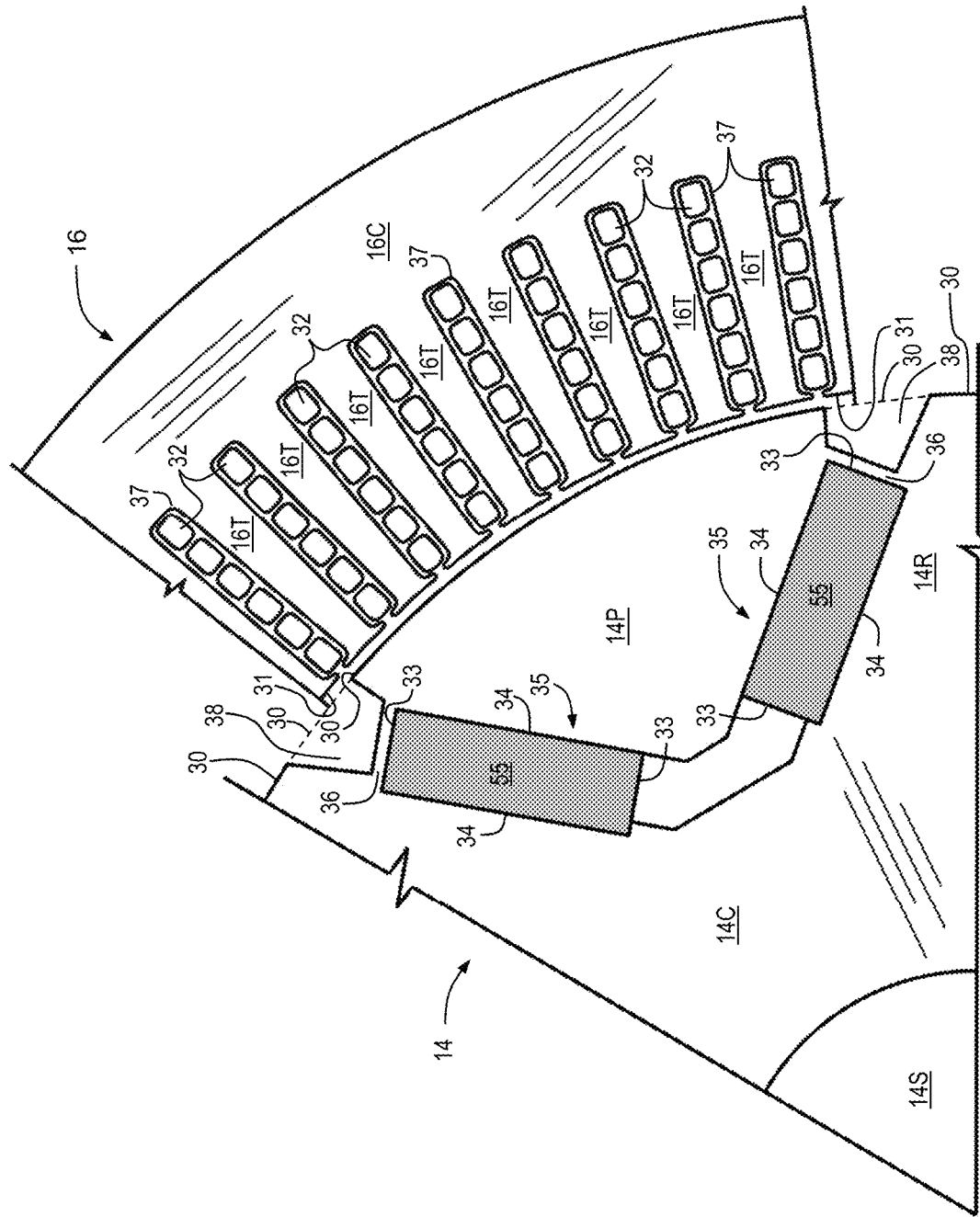
FIG. 2 illustrates an interior permanent magnet machine, in accordance with one or more embodiments.

FIG. 2 depicts a single magnetic pole of the rotor 14 and a portion of the stator 16 proximate thereto of FIG. 1 in accordance with an IPM machine embodiment. PMSR machine embodiments are similarly constructed. The depiction in FIG. 2 is representative of an exemplary six-pole embodiment of the rotor 14, with the remaining five poles being identical to the exemplary pole of FIG. 2 and thus omitted for illustrative simplicity and clarity. It is understood that rotors of any number of poles may be employed. The six-pole embodiment of FIG. 2 is therefore non-limiting and illustrative of just one possible configuration.

The stator 16 of FIG. 1 in accordance with the embodiment of FIG. 2 has radially-projecting stator teeth 16T extending inward from a cylindrical stator core 16C. That is, the stator teeth 16T extend toward the rotor 14 from the stator core 16C. The inner diameter surface 31 of the stator 16 is the radially-innermost surface of the stator teeth 16T facing or opposing the outer diameter surface 30 of the rotor 14 in spaced adjacency to form the air gap G (see FIG. 1). Adjacent stator teeth 16T are separated from each other by a corresponding stator slot 37, as will be appreciated by those of ordinary skill in the art. The stator slots 37 enclose electrical conductors, typically copper wires or copper bars/ "hairpins". Such conductors collectively form stator windings 32. A rotating stator magnetic field is generated when the stator windings 32 are sequentially-energized by a polyphase output voltage from the TPIM 28 of FIG. 1. Stator magnetic poles formed from the resulting rotating stator magnetic field interact with rotor poles to rotate the rotor 14 including the rotor shaft 14S.

In the IPM machine embodiment of FIG. 2, the rotor 14 includes an embedded set of permanent magnets collectively referred to herein as rotor magnets 55. The rotor magnets 55 may be constructed, for example, of ferrite, Neodymium-iron-boron, Samarium cobalt, aluminum-nickel-cobalt, etc., or another application-suitable material. The rotor magnets 55 in such embodiment are embedded within respective rotor slots 35 within the stack of individual steel laminations of the rotor 14. The number, type, position, and/or relative orientation of the rotor magnets 55 ultimately influences the magnitude and distribution of magnetic flux in the ferrous materials of the electric machine 12. The rotor magnets 55 may be arranged in pole pairs as shown in a generally V-pattern configuration when the rotor 14 is viewed along its axis of rotation. In such a V-pattern configuration, an outer short end 33 of the rotor magnets 55 is closer to the outer diameter surface 30 of the rotor 14 than the other inner short end 33 of the rotor magnets 55. The short ends 33 of the rotor magnets 55 closest to outer diameter surface 30 are spaced further apart than are the short ends 33 of the rotor magnets 55 located closer to the rotor shaft 14S. Also, when viewed axially as in FIG. 2, the rotor magnets 55 of each pole pair may be symmetrically distributed with respect to a corresponding rotor pole piece 14P and on each side thereof with one elongated side 34 of the rotor magnets 55 facing the rotor pole piece 14P. The opposite elongated side 34 of the rotor magnets 55 of each pole pair faces a rotor rib 14R located between each rotor pole and extending radially outward from the rotor core 14C. A bridge 36 extends between the pole piece 14P and the rib 14R and structurally ties the pole piece 14P to the rib 14R. The bridge 36 is located between the outer short end 33 of the magnet 55 and the outer diameter surface 30 of the rotor 14. More particularly, the bridge 36 is located away from and beneath the outer diameter surface 30 of the rotor 14 and forms the base of a channel 38 at the periphery of the outer diameter surface 30 of the rotor 14 as further described herein. The bridge 36 in FIG. 2 is illustrated immediately adjacent the outer short end 33 of the rotor magnet 55, however, the bridge 36 may be in spaced adjacency with the short end 33 of the rotor magnet 55 separated by a flux barrier. The rotor slots 35 corresponding to a pole pair of rotor magnet 55 may be continuous and join between the short ends 33 of the rotor magnets 55 located closer to the rotor shaft 14S thereby providing a flux barrier between the pole piece 14P and the rotor core 14C.

Figure 3:
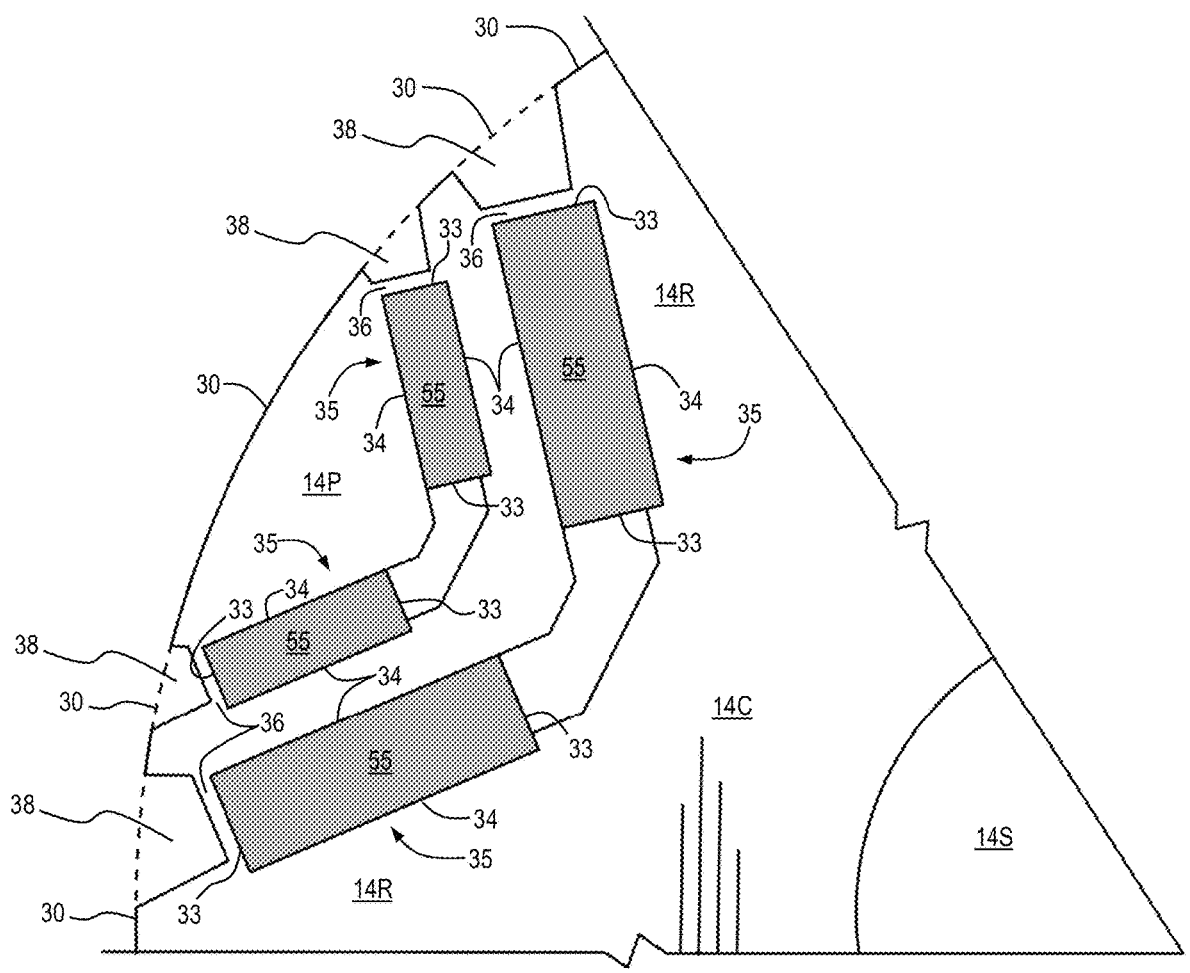
FIG. 3 illustrates a rotor for an interior permanent magnet machine, in accordance with one or more embodiments.

FIG. 3 depicts a single magnetic pole of the rotor 14 of FIG. 1 in accordance with an IPM machine embodiment having two pole pairs of rotor magnets 55 per pole wherein the rotor magnets 55 are arranged in a dual V-pattern, with a larger first pole pair of the rotor magnets 55 arranged in a V-pattern flanking a smaller second pole pair of the rotor magnets 55, which is likewise arranged in a V-pattern. PMSR machine embodiments are similarly constructed. The illustrated configurations of the rotor magnets 55 in FIG. 2 and FIG. 3 are exemplary embodiments of IPM and PMSR machines. Other IPM and PMSR machine embodiments, including additional magnets and alternative arrangements may be apparent to one having ordinary skill in the art.

Figure 4:
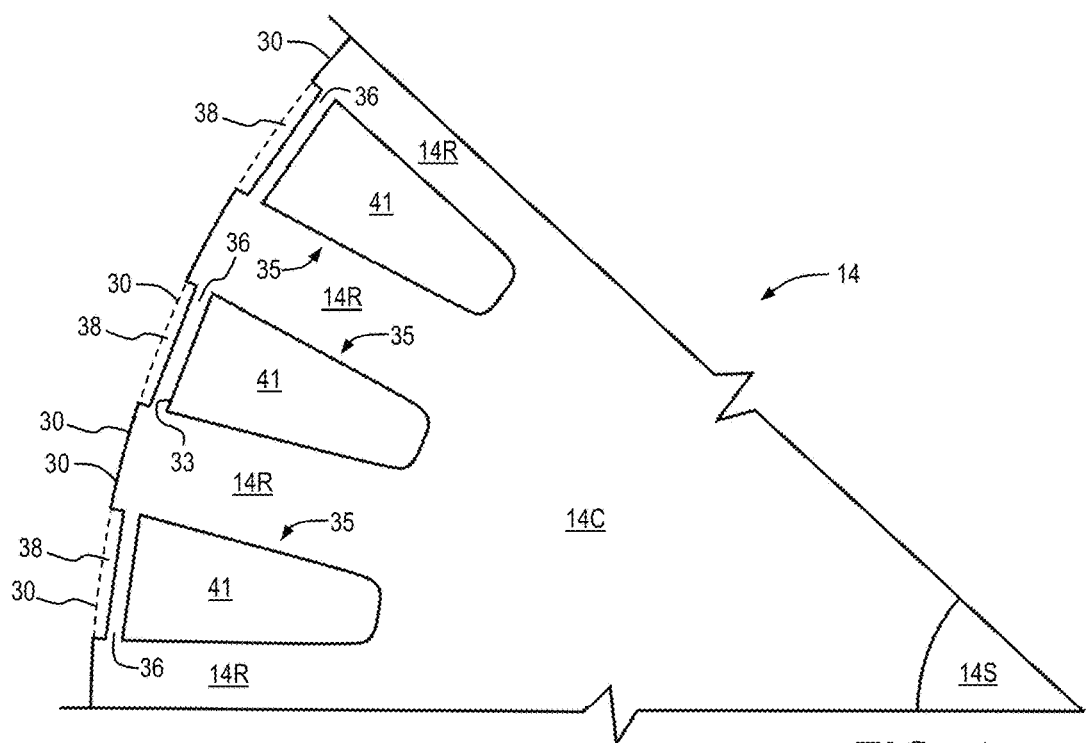
FIG. 4 illustrates a rotor for an induction machine, in accordance with one or more embodiments.

FIG. 4 depicts a portion the rotor 14 of FIG. 1 in accordance with an inductive machine embodiment. In the inductive machine embodiment of FIG. 4, the rotor 14 includes an embedded set of conductive bars 41 collectively referred to herein as a squirrel cage. The conductive bars 41 may be constructed, for example, of aluminum, copper, brass, or another application-suitable material. The conductive bars 41 in such embodiment are embedded within respective rotor slots 35 within the stack of individual steel laminations of the rotor 14. The conductive bars 41 may be slightly skewed relative to the rotational axis of the rotor 14. The cross sectional shape of the conductive bars 41 as viewed along the rotor 14 axis of rotation in FIG. 4 is merely exemplary and non-limiting. Also, when viewed axially as in FIG. 2, the conductive bars may be symmetrically distributed about the perimeter of the rotor 14 with adjacent conductive bars separated by ribs 14R. A bridge 36 extends between the ribs 14R and structurally ties the ribs 14R on both sides of a conductive bar 41 together. The bridge 36 is located between the outer end 33 of the conductive bar 41 and the outer diameter surface 30 of the rotor 14. More particularly, the bridge 36 is located away from and beneath the outer diameter surface 30 of the rotor 14 and forms the base of a channel 38 at the periphery of the outer diameter surface 30 of the rotor 14 as further described herein.

Figure 5:
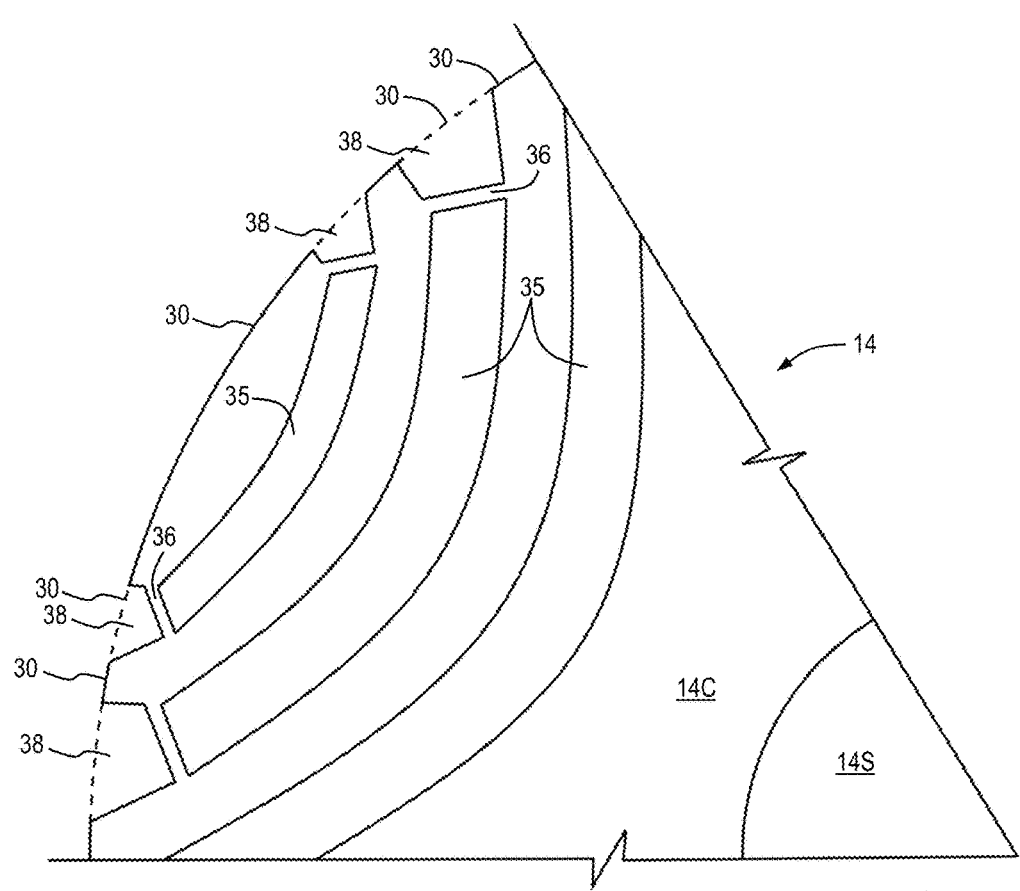
FIG. 5 illustrates a rotor for a synchronous reluctance machine, in accordance with one or more embodiments.

FIG. 5 depicts a portion the rotor 14 of FIG. 1 in accordance with synchronous reluctance machine embodiment. In the synchronous reluctance machine embodiment of FIG. 5, the rotor 14 includes no magnets nor conductive bars in the slots 35. Bridges 36 extend between and structurally ties the electrical steel on both sides of slots 35 together. The bridges 36 are located between the ends of the slots 35 and the outer diameter surface 30 of the rotor 14. More particularly, the bridge 36 is located away from and beneath the outer diameter surface 30 of the rotor 14 and forms the base of a channel 38 at the periphery of the outer diameter surface 30 of the rotor 14 as further described herein.

Figure 6:
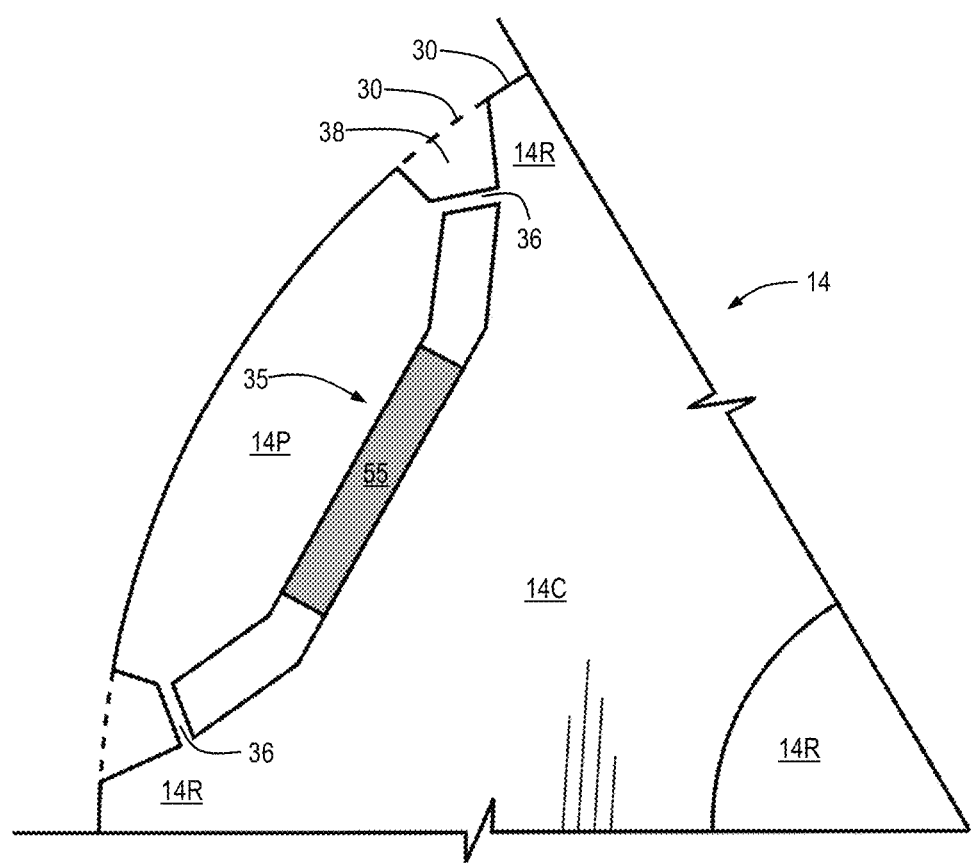
FIG. 6 illustrates a rotor for an interior permanent magnet machine, in accordance with one or more embodiments.

FIG. 6 depicts a single magnetic pole of the rotor 14 of FIG. 1 in accordance with another exemplary embodiment of an IPM machine having a single rotor magnet 55 per pole wherein the rotor magnets 55 are arranged central to the pole piece 14P and the rotor slot 35. The single slot 35 includes bridges 36 at both ends thereof.

Figure 7:
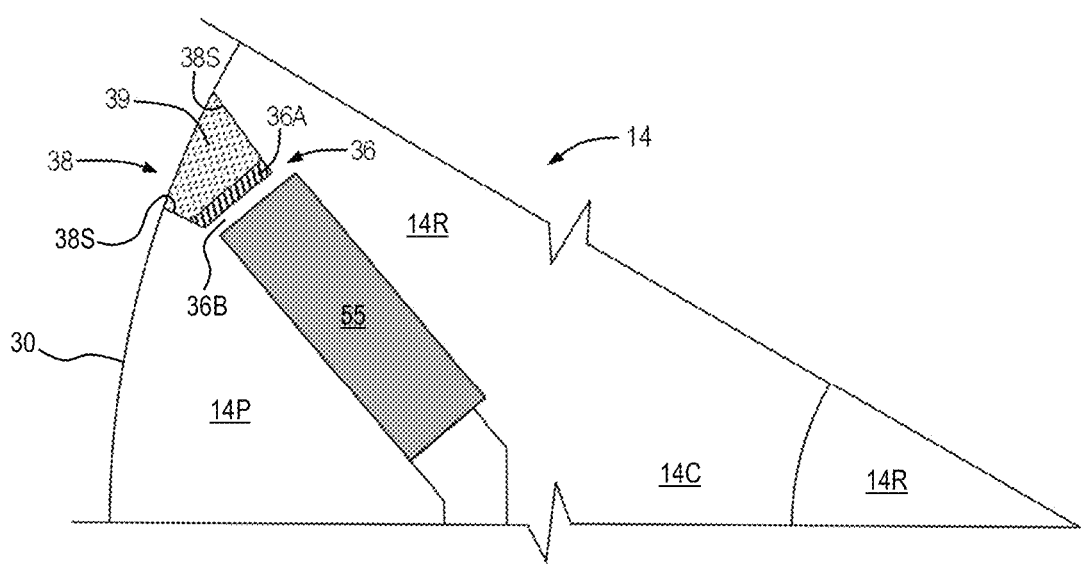
FIG. 7 illustrates a rotor for an interior permanent magnet machine, in accordance with one or more embodiments.

In the various exemplary machine embodiments of FIGS. 2-6, and with further reference to FIG. 7, it is appreciated that locating the bridge 36 beneath the outer diameter surface 30 of the rotor 14 advantageously allows for manufacturing the individual steel laminations of the rotor 14 with an integral thinned bridge section 36B which by itself may not provide sufficient structural integrity for the rotor 14, but which provides a base or substrate in conjunction with the sidewalls 38S of the channel 38 at the periphery of the outer diameter surface 30 of the rotor 14 for integrating a supplemental bridge support 36A as described further herein.

Figure 8:
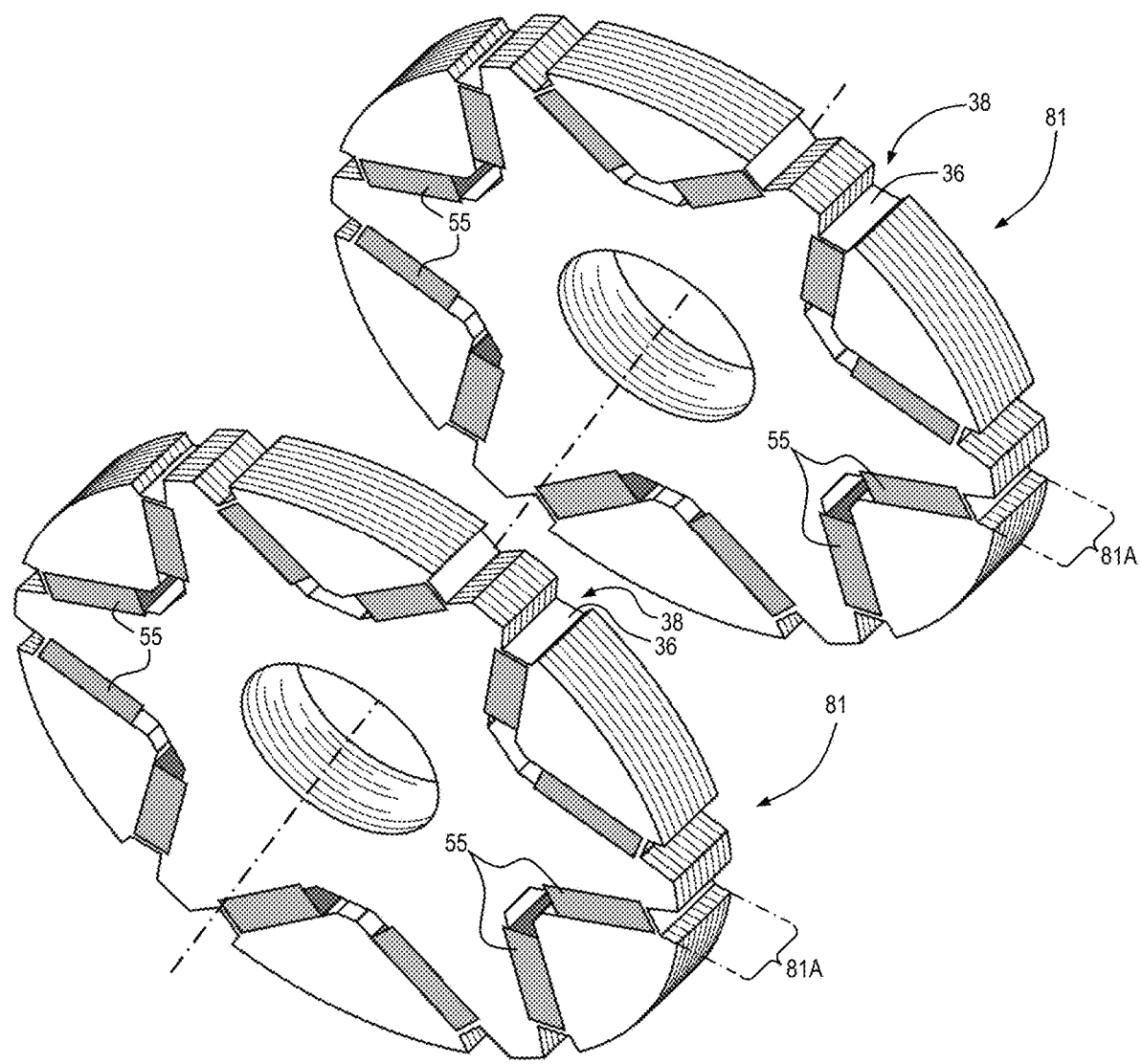
FIG. 8 illustrates a rotor for an interior permanent magnet machine, in accordance with one or more embodiments.

With additional reference to FIG. 8 and continued reference to FIG. 7, the stack of individual steel laminations of the rotor 14 may include two or more sub-stacks 81 which may be separately processed as described herein. Each sub-stack 81 includes a plurality of individual laminations 81A which may be equivalent or differ in number. In an embodiment, the supplemental bridge support 36A may be a structural flux barrier, for example a substantially rectangular piece of paramagnetic metal placed into the channel 38 and structurally attached to the surrounding electrical steel (e.g., sidewalls 38S of the channel 38 and or the thinned bridge section 36B), for example welded in place by any suitable welding process including, for example, plasma or TIG arc, laser, or friction welding. Alternative structural attachments of the supplemental bridge support 36A may be employed including, for example, soldering, brazing or structural adhesives. In an embodiment, the thinned bridge section 36B may have the exposed surface opposite the slot alloyed prior to installation of the supplemental bridge support 36A. Surface alloying may be accomplished by diffusion of the alloy or melt mixing of the alloy and the thinned bridge section 36B electrical steel. Any suitable heat source, for example, plasma or TIG arc or laser may be used in the surface alloying. In an embodiment, the alloy may be preplaced, such as by paste application or thermal spray, or may be fed during heat application such as by wire feed. In an embodiment, high energy density laser alloying is employed for accurate melt depth control. Surface alloying may advantageously result in reduced flux leakage through the thinned bridge section 36B due to the greater reluctance of the resulting alloy. In an embodiment, the supplemental bridge support 36A may be deposited in situ on top of the thinned bridge section 36B between and upon the sidewalls 38S of the channel 38, by wire arc deposition, thermal spray, cold spray, electroplating, laser cladding or combinations thereof. In an embodiment, materials suitable for the supplemental bridge support 36A and alloying may include, for example, austenite formers such as Carbon (C), Nickel (Ni), Manganese (Mn), and Nitrogen (N), as well as Iron (Fe), Aluminum (Al), Silicon (Si), Chromium (Cr), Niobium (Nb), Molybdenum (Mo), and Titanium (Ti). Additional localized heat treating of the bridge 36 may be employed after the supplemental bridge support 36A is finished to relieve material stresses and/or austenitizing. In an embodiment, the sidewalls 38S of the channel 38 are non-parallel and increasingly open toward the outer diameter surface 30 of the rotor 14. Such a configuration of the sidewalls 38S of the channel 38 advantageously enable manufacturing access to the thinned bridge section 36B for material placement and tool access during manufacture. In an embodiment, the channels 38 may be filled with a non-magnetic and electrically non-conductive filler material 39, for example a dielectric polymer, which bonds to the bridge 36 and sidewalls 38S of the channel 38 and may be formed to follow the outer diameter surface 30 of the rotor 14. In an embodiment, the filler material 39 may also function as the supplemental bridge support 36A. Processing sub-stacks may advantageously limit eddy currents in an assembled rotor stack by providing conductive breaks between respective supplemental bridge support 36A. Processing sub-stacks may advantageously allow for segmented rotor magnet 55 installation.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

All numeric values herein are assumed to be modified by the term "about" whether or not explicitly indicated. For the purposes of the present disclosure, ranges may be expressed as from "about" one particular value to "about" another particular value. The term "about" generally refers to a range of numeric values that one of skill in the art would consider equivalent to the recited numeric value, having the same function or result, or reasonably within manufacturing tolerances of the recited numeric value generally. Similarly, numeric values set forth herein are by way of non-limiting example and may be nominal values, it being understood that actual values may vary from nominal values in accordance with environment, design and manufacturing tolerance, age and other factors.

Unless explicitly described as being "direct," when a relationship between first and second elements is described in the above disclosure, that relationship can be a direct relationship where no other intervening elements are present between the first and second elements but can also be an indirect relationship where one or more intervening elements are present (either spatially or functionally) between the first and second elements.

One or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:
1. An electric machine, comprising:
a stator; and
a rotor comprising stacked plurality of electrical steel laminations forming a slot including a first end and opposing sides, the first end defined by a bridge extending between electrical steel on opposing sides of the slot, the bridge being located between the first end of the slot and an outer diameter surface of the rotor and beneath the outer diameter surface of the rotor, the bridge forming a base of a channel open at an outer diameter surface of the rotor,
wherein the bridge comprises an electrical steel bridge section integral with the laminations and a supplemental bridge support comprising a structural flux barrier.
2. The electric machine of claim 1 wherein the supplemental bridge support comprises a paramagnetic metal.
3. The electric machine of claim 2 wherein the supplemental bridge support comprising the paramagnetic metal is welded to the laminations.
4. The electric machine of claim 2 wherein the supplemental bridge support comprising the paramagnetic metal is deposited in situ upon the electrical steel bridge section.
5. The electric machine of claim 1 wherein the electrical steel bridge section being surface alloyed on a surface opposite the first end of the slot.
6. The electric machine of claim 5, wherein the bridge is austenitized through a localized heat treatment.

7. The electric machine of claim 1 wherein the channel open at the outer diameter surface of the rotor comprises non-parallel sidewalls increasingly opening toward the outer diameter surface of the rotor.

8. The electric machine of claim 1 wherein the channel is filled with a dielectric polymer.

9. The electric machine of claim 1, further comprising one of a permanent magnet within the slot or a conductive bar within the slot.

10. An electrified powertrain for a vehicle, comprising:
a battery pack;
a traction power inverter module ("TPIM") connected to the battery pack, and configured to change a direct current ("DC") voltage from the battery pack to an alternating current ("AC") voltage; and
a rotary electric machine energized by the AC voltage from the TPIM, and comprising:
a stator;
a rotor, surrounded by the stator, comprising a stacked plurality of electrical steel laminations forming a slot including a first end and opposing sides, the first end defined by a bridge extending between electrical steel on opposing sides of the slot, the bridge being located between the first end of the slot and an outer diameter surface of the rotor and beneath the outer diameter surface of the rotor, the bridge forming a base of a channel open at an outer diameter surface of the rotor;
a rotor shaft connected to and surrounded by the rotor, and configured to rotate about an axis of rotation in conjunction with the rotor when the electric machine is energized; and
a transmission coupled to the rotor shaft and powered by the electric machine,
wherein the bridge comprises an electrical steel bridge section integral with the laminations and a supplemental bridge support comprising a structural flux barrier.

11. The electrified powertrain of claim 10 wherein the supplemental bridge support comprises a paramagnetic metal.

12. The electrified powertrain of claim 11 wherein the supplemental bridge support comprising the paramagnetic metal is welded to the laminations.

13. The electrified powertrain of claim 11 wherein the supplemental bridge support comprising the paramagnetic metal is deposited in situ upon the electrical steel bridge section.

14. The electrified powertrain of claim 10 wherein the structural flux barrier is welded to the laminations.

15. The electrified powertrain of claim 10 wherein the electrical steel bridge section being surface alloyed on a surface opposite the first end of the slot.

16. The electrified powertrain of claim 10 wherein the channel open at the outer diameter surface of the rotor comprises non-parallel sidewalls increasingly opening toward the outer diameter surface of the rotor.

17. The electrified powertrain of claim 10 wherein the channel is filled with a dielectric polymer.

18. The electrified powertrain of claim 10 further comprising one of a permanent magnet within the slot or a conductive bar within the slot.

19. A method of constructing a rotor comprising:
stacking a plurality of electrical steel laminations forming a slot including a first end and opposing sides, the first end defined by a bridge extending between electrical steel on opposing sides of the slot, the bridge being located between the first end of the slot and an outer diameter surface of the rotor and beneath the outer diameter surface of the rotor, the bridge forming a base of a channel open at an outer diameter surface of the rotor;
welding a supplemental bridge support to the laminations at the base of the channel; and
filling the channel with a non-magnetic and electrically non-conductive material.

20. The method of claim 19, further comprising at least partially filling the slot with one of a permanent magnet and a conductive bar.

* * * * *